United States Patent [19]

Keszler

[11] 4,057,650
[45] * Nov. 8, 1977

[54] BACON-LIKE MEAT PRODUCT OF REDUCED FAT CONTENT

[76] Inventor: Julius L. Keszler, Boston Post Road, Westbrook, Conn. 06498

[*] Notice: The portion of the term of this patent subsequent to June 17, 1992, has been disclaimed.

[21] Appl. No.: 701,797

[22] Filed: July 1, 1976

Related U.S. Application Data

[63] Continuation of Ser. No. 556,736, March 10, 1975, abandoned, which is a continuation-in-part of Ser. No. 350,142, April 11, 1973, Pat. No. 3,890,451.

[51] Int. Cl.$^2$ .............................................. A23L 1/31
[52] U.S. Cl. ..................................... 426/92; 426/513; 426/644; 426/646
[58] Field of Search ............... 426/274, 646, 272, 104, 426/641, 652, 92, 513, 264, 645, 644, 321, 532, 521

[56] References Cited

U.S. PATENT DOCUMENTS

| | | | |
|---|---|---|---|
| 3,432,311 | 3/1969 | Gruner | 426/646 X |
| 3,634,127 | 1/1972 | Vogel et al. | 426/646 |
| 3,740,235 | 6/1973 | Weiner | 426/646 |
| 3,890,451 | 6/1975 | Keszler | 426/513 X |
| 3,914,444 | 10/1975 | Svacik | 426/646 X |

*Primary Examiner*—S. Leon Bashore
*Assistant Examiner*—Kenneth M. Schor
*Attorney, Agent, or Firm*—Prutzman, Hayes, Kalb & Chilton

[57] ABSTRACT

Small meat pieces are secured in an integral, internally knitted, bound and coalesced form by a new and improved curing and binding composition comprised of an aqueous saline curing agent blended into and absorbed within ground meat particles to form a solid unified mass or body of meat which on slicing has a texture, color and general appearance similar to a primal meat cut. The composite meat product is characterized by an integrated boundary between abutting pieces of meat as well as between meat and fat areas, yet the binding and curing composition is not visibly noticeable in the finished product. It is at least partially absorbed by the meat pieces and effects the fused integral appearance of the desired final product which does not separate upon handling or slicing. The product is produced by a technique that permits its processing into any desired shape or form including that of bacon with all the attendant beneficial characteristics thereof yet with a reduced fat content. This technique involves the steps of mixing small meat pieces of desired lean content with the binder composition. The mixture may be cured under refrigeration before or after being packed within a moisture impermeable casing and controllably heated to effect the desired bonded texture and appearance. The process permits production of meat products that need not be refrigerated yet will maintain their appearance, texture and quality for prolonged periods of time.

5 Claims, 3 Drawing Figures

BACON-LIKE MEAT PRODUCT OF REDUCED FAT CONTENT

RELATED APPLICATION

This is a continuation of application Ser. No. 556,736 filed Mar. 10, 1975, now abandoned, which in turn is a continuation-in-part of Ser. No. 350,142, filed Apr. 11, 1973, now U.S. Pat. No. 3,890,451.

BACKGROUND AND SUMMARY OF THE INVENTION

The present invention relates generally to meat products. More particularly, it is concerned with a new and improved curing and binding composition useful in producing composite meat products of controlled lean meat and fat content, with an improved process for producing both the curing and binding composition and the composite meat product and with the composite meat product thus produced.

As is well known, slabs of cured and/or smoked bacon cut from the carcass of a pig generally contain an inordinately high fat content. The bacon, which is conventionally cut into oblong blocks and subsequently sliced into thin strips, is usually fried, broiled or grilled and consumed despite its high fat content. Of course, as can be appreciated, the lean meat content of the bacon is subject to little or no control and is dependent on the natural condition of the animal. Accordingly, it is one object of the present invention to provide a new and improved meat product that can conveniently take the shape or form of sectional bacon and exhibits many of its characteristics yet can be produced in a far more economical manner with a substantially increased lean meat or fat content, and, in fact, in such a manner as to completely control the lean meat and fat content of the resultant sectional bacon-like product.

As is also known, certain processed meat products such as canned hams and the like are produced from large pieces or chunks of lean meat that have been boned and compacted to a desired size. Additionally, integrated beef and pork products have been similarly produced from large chunks of beef by forming a creamy exudate on the surface of the meat, preferably while the meat is frozen, and subsequently compacting the meat into the desired form and size. The creamy exudate, believed to be a type of protein, functions primarily as a means of promoting adhesion between the meat chunks during the compacting operation. However, the interface between the chunks not only remains readily discernible but thin slices of the meat tend to fall apart at the interface between the chunks. Thus, another object of the present invention is to provide a unique curing and binding composition that provides blending of the meat pieces at the interface between not only meat chunks but also meat and fat areas, and provides complete integrity of the product even in thin slices.

In my U.S. Pat. No. 3,663,233 there is also disclosed another method of packaging and tenderizing large chunks of lean meat. The disclosure therein including the discussion of prior art techniques is incorporated herein by reference. In particular, reference is made to the prior curing techniques that use either smoking, dry curing agents and a prolonged curing period, arterially injection and machine pumping of a brine solution or immersion of the meat in the curing solution. In this connection, it is still another object of the present invention to provide a product of the type described that obviates the need for smoking and other curing procedures prior to the preparatory steps of the process but can employ fresh cuts of meat and produce meat products of fine texture including bacon-like products in a rapid and economical manner.

A further object of the present invention is to provide a new and improved integrated or composite meat product comprised of small pieces of whole meat including trimmed, semi-trimmed and untrimmed fresh meat in an uncooked condition. The pieces are integrally united or bonded into a solid mass or body of meat by means of a binder that is not visibly noticeable in the end product due to its finely dispersed nature through and among the small meat pieces. Full control can be exercised over the lean content of the product as the binder blends and knits the individual pieces of both trimmed and untrimmed meat so as to impart to the meat product the integrity necessary to permit slicing into thin integral strips. Upon frying, boiling or grilling, the bacon-like product exhibits the characteristic undulations of bacon yet possesses a controlled fat content. Included in this object is the provision for products made from poultry, pork, lamb, veal or beef including pastrami of controlled fat content.

A still further object of the present invention is to provide a new and improved process for producing an integrated meat product of the type described which retains, preserves and conserves the fresh meat taste, color and green weight yet obviates the need for the formation of a surface exudate. At the same time the process provides a heretofore unrealized degree of flexibility that permits storage at different stages of manufacture of the meat product and the ability to store the product for as long as six months or more without loss of its fresh meat taste, color or weight.

Another object is to provide a manner of preparing processed meats useful as substitutes for larger cuts such as roasts, steaks, cutlets, minute steaks and the like while retaining the fresh meat taste, texture, appearance and weight and reducing the fat content. Included in this object is the provision for composite meats having the texture, appearance and character of primal cuts in a wide variety of shapes and sizes.

Other objects will be in part obvious and in part pointed out in more detail hereinafter.

These and related objects are accomplished in accordance with the present invention by providing a composite pasteurized or sterilized meat product comprised of a mixture of small untrimmed, semi-trimmed or trimmed uncooked meat pieces having a controlled fat content secured in an integral, internally knitted, bound and coalesced form by a binder comprised of a curing agent and ground meat particles blended into and absorbed within a solid unified mass or body of meat and which on slicing has a texture, color and general appearance similar to a primal meat cut. The product is characterized by an integrated boundary between abutting pieces of meat as well as between its meat and fat areas and abutting fat areas. It is a benefit of the present invention that the binding composition includes both binding and curing agents yet is not visibly noticeable in the finished product. It is at least partially absorbed by the meat pieces and effects the fused integral appearance of the desired final product which does not separate upon handling or slicing. Advantageously, the product is produced by a technique that permits its processing into any desired shape or form including that of bacon with all the attendant beneficial characteristics thereof yet with a controlled fat content. This technique involves the steps of providing small pieces of economical meat cuts that are blended with an appropriate binder and compressed into an appropriate form. The binder consists of a suitable saline curing agent which is fully and intimately blended with appropriate quantities of ground lean meat to a fine sticky consistency and is then mixed with the small pieces of meat prior to being stuffed into a moisture impermeable casing for molding or contouring into the desired shape or form. The material preferably is first cured under refrigeration for a period of about 14 hours or more or may be directly subjected to an appropriately controlled pasteurizing and knitting treatment prior to storage and packaging. The process permits production of meat products that maintain their appearance and green weight for periods of six months or more.

A better understanding of the objects, advantages, features, properties and relationships of the invention will be obtained from the following detailed description and accompanying drawing which sets forth an illustrative embodiment and is indicative of the way in which the principles of the invention are employed.

A BRIEF DESCRIPTION OF THE DRAWING

A DESCRIPTION OF A PREFERRED EMBODIMENT

Figure 1:
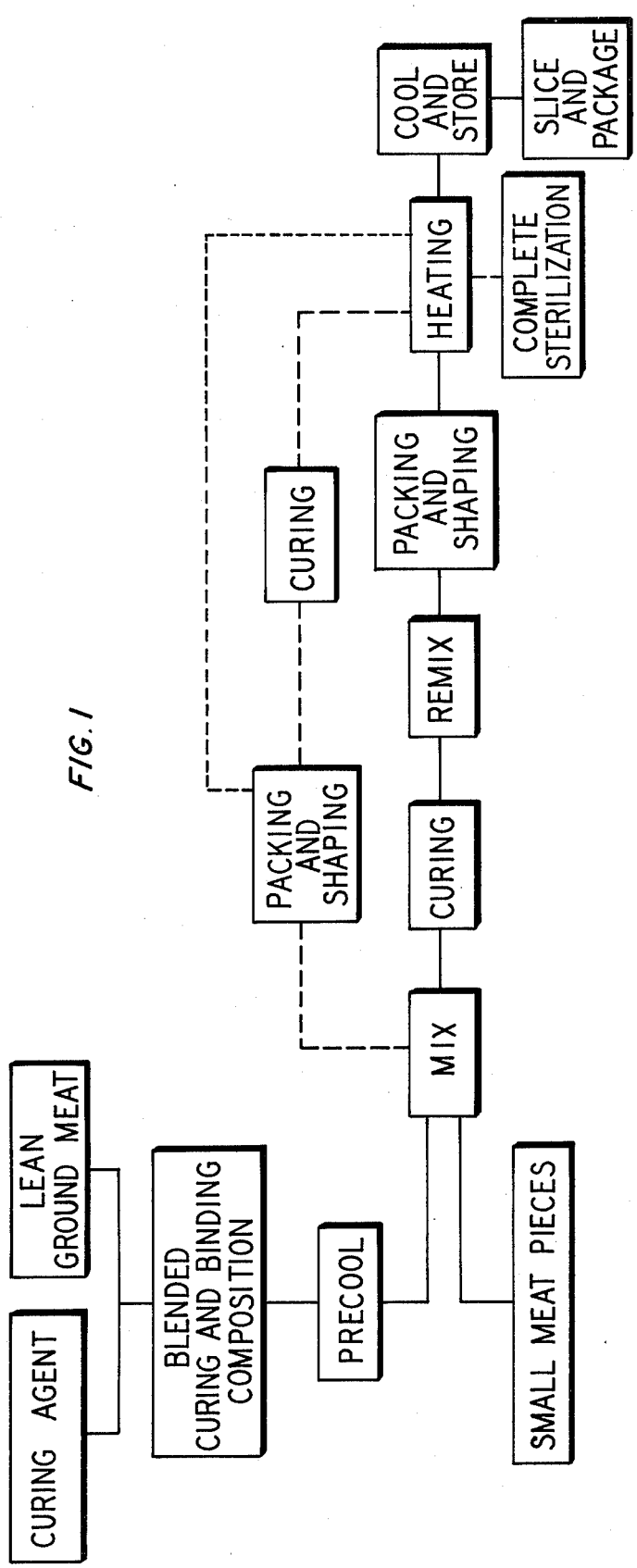
FIG. 1 is a flow diagram generally indicating the process steps utilized in accordance with the present invention.

Referring now to the drawing in greater detail, the process of the present invention is shown diagrammatically in FIG. 1 as consisting generally of the initial step of preparing small pieces of meat and separately providing a blended binder composition containing a curing agent. The meat cuts are preferably small pieces of an economical grade red meat from animals such as beef, pork, veal and the like although poultry may also be used. The small pieces of meat may be used in their boned but untrimmed condition without removal of the fat adhered thereto or in a partially trimmed or fully trimmed condition. These pieces, which are only about ¼ ounce to about 6 to 8 ounces and preferably about one to two ounces in size, should be distinguished from large cuts or chunks of lean primal meat. Preferably, the meat pieces are those cuts obtained from the thin underportion of the animal such as the plate, flank or ribs including the short ribs and the like. Although these pieces may have a fat content of about 55% or more and are considered to be the more economical cuts, the quality may be of U.S. Grade Good, Choice, Prime or other comparable quality depending on the desired end product. These small boned pieces of meat are preferably cut to the requisite size and are stored under refrigerated conditions until mixed with the binder composition. Unlike prior exudate bonding techniques the meat pieces should not be in a frozen condition at the time they are mixed with the binder but should be at a cooled or chilled temperature of about 32° – 50° F and preferably about 38° – 42° F in order to permit the colder binder to permeate through the small pieces and effect the desired curing and binding action.

As indicated, the curing and binding composition used in accordance with the present invention consists of two essential components, i.e., a curing agent and an appropriate quantity of ground lean meat. Although the actual composition of the curing agent can vary to suit the taste required in the final product, the curing agent is preferably an aqueous saline or brine solution of the type mentioned in my U.S. Pat. No. 3,663,233. In addition to its major component, salt or sodium chloride, it contains an appropriate amount of sugar, meat phosphates, sodium nitrates and nitrites, hydrolized plant protein and the like. These materials are mixed with water in appropriate proportions and chilled to about 20° F prior to being blended with the ground lean meat. In this connection salt will constitute up to about 25 percent by weight of the aqueous curing agent and preferably about 10 – 20 percent by weight.

The other major component of the curing and binder composition of the present invention is ground lean meat that is used partially to adjust and control the fat content of the final product but primarily to provide an appropriate integrating media for the small pieces of meat including fat portions that constitute the major portion of the meat product. In this connection, the ground lean meat may constitute from about 20 percent up to about 75 percent by weight of the total binder composition but preferably is used in quantities of about 30 to 60 percent by weight, e.g., 35 – 50 percent. Since the added lean meat is finely ground, it can be obtained from substantially any portion of the carcass and may be of any desired quality and type. Thus it can be of the same kind of meat as the small pieces or different therefrom depending on the desired product.

In accordance with the preferred embodiment, the meant is maintained in a chilled condition prior to being blended with the curing agent and is ground three or four times to assure a fine consistency. Preferably a portion of the curing agent is added during the grinding operations with the remainder subsequently blended therein until the final binder composition exhibits a pasty or sticky consistency. The binder composition then is cooled to a temperature at least 10° – 20° F below the temperature of the meat pieces and preferably about 30° – 50° F below that temperature whereby the binder is at a temperature of 0° F to best promote and enhance the coating of the binder on all surfaces of the meat pieces during the brief mixing operation. The mixing is carried out by conventional techniques and involves simply mixing the meat with the binding agent for a period of about 3 to 4 minutes or such additional time as is required to expose all surfaces of the small meat pieces to the pasty sticky binder material.

After the mixing operation, the blended meat pieces coated with binder are prepared for the heating step of the process. This may involve placing the mixture within a suitable moisture impermeable casing of natural or artificial material and of appropriate size and shape and then mold the encased material into the desired from followed by curing under refrigeration or heating. The encased material preferably is refrigerated at about 32° – 60° F for a curing period that usually lasts about 14 hours or more. However, if desired, alternatively the material may be cured prior to encasement and thereafter remixed, encased and subjected to the subsequent heating operation.

As will be appreciated from the foregoing, the process provides for rapid preparation, blending and curing of the meat product in its initial form prior to incremental heating to fuse the individual meat pieces into the composite product. This eliminates the necessity for any precuring or precooking of the initial ingredients yet provides for rapid and easy compounding and control over the lean and/or fat content therein. Advantageously, the curing period can be eliminated or extended well beyond the 14 hours mentioned hereinabove without adversely affecting the product and, in view of its preformed or premolded condition it is well suited to the subsequent heating operations.

The heating is advantageously conducted in sequential steps; namely, conditioning, coalescing sterilizing or pasteurizing and cooking operations. In the conditioning operation the molded product is placed within a heating chamber or tank with the water therein slightly cooler than room temperature, i.e., about 60° F. The water temperature is then raised to about 105° - 115° F and preferably to about 108° - 112° F for a period of about one to two hours. This conditioning period is essential in order to retain and maintain the appropriate and desired pink color within the final product and at the same time subject the product to an initial peripheral or surface stabilizing operation. The conditioning operation is believed to be primarily a surface conditioning phenomenon in preparation for the subsequent coalescing and pasteurizing of the interior of the product although some surface bonding may also take place during this initial heating phase.

Following the conditioning period, the water temperature of the heating tank is increased by about 10° or so to about 115° - 125° F and preferably to about 120° - 122° F and maintained at this temperature for a period of about 1 to 4 hours and preferably 2 to 3 hours followed by a subsequent increase in water temperature sufficient to raising the internal temperature of the product to about 145° F. At this stage, the meat product exhibits the desired pink coloration throughout its entire cross-section and the binding is complete. In one aspect of the process the bonded composite meat product is then cooled slowly to a temperature of about 130° F and held at this temperature for a sufficient period of time to assure sterilization. In most cases sterilization is achieved prior to reducing the temperature but maintenance of the product of 130° temperature further assures this condition. In this connection maintaining the 130° temperature for 48 hours is sufficient to provide the desired result and is equivalent to cooking the product at about 250° F for 30 minutes. However, it is an advantage of the present invention that the sterilized product produced at the lower temperature retains its pink color and fresh appearance and exhibits no weight loss. Of course the product may be stored under refrigeration if desired. Subsequently, the cooled product can be sliced and packaged for distribution. For example, a 2 inch thick slab of the composite meat product can easily be cut or sliced in a bacon slicing machine following which it can be portion controlled and vacuum packed to produce a package such as that illustrated in FIG. 2 or it can take other suitable forms such as that shown in FIG. 3. As will be appreciated, the slicing and packaging operations can be omitted, if desired.

Figure 2:
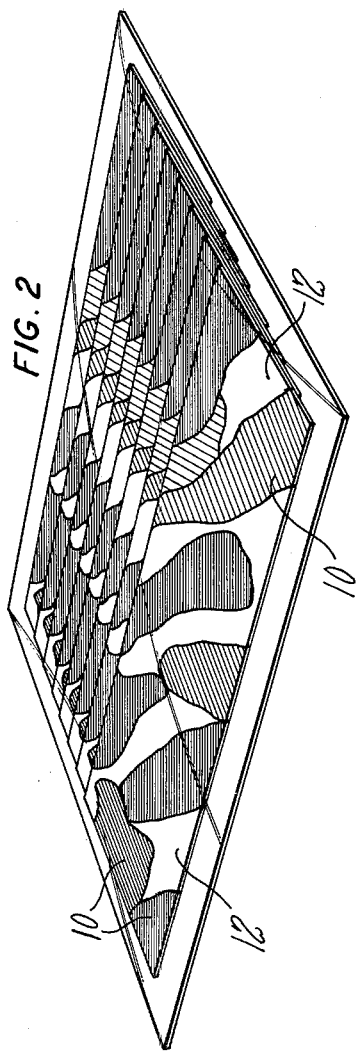
FIG. 2 is a perspective view illustrating the sliced and packaged product in accordance with the present invention.

Referring now to FIG. 2 of the drawing the resultant composite meat product is illustrated in a sliced and packaged form similar to that conventionally associated with sliced bacon. Each slice of the meat product consists of a plurality of discrete meat areas 10 randomly interspersed and integrally bonded to each other and to discrete areas of fat 12, with all areas in the meat product having discernable boundaries which appears to be fused or integrally blended, knitted or bonded to adjacent areas of either additional meat portions of fat portions in a manner similar to that exhibited in the natural texture of primal cuts of meat. This pasteurized or sterilized and cured meat product, while exhibiting many of the characteristics of bacon, advantageously possesses a controlled quantity of lean meat and fat content.

Figure 3:
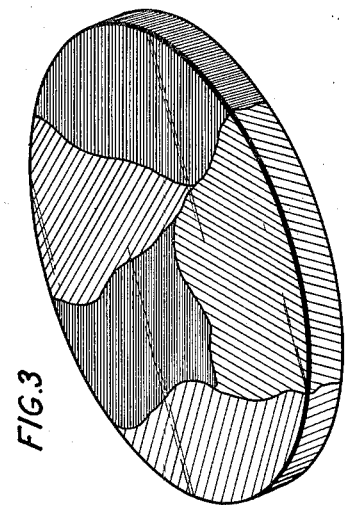
FIG. 3 is a perspective view illustrating the thicker steak, cutlet or chop produced in accordance with the present invention.

As illustrated in FIG. 3, substantially all trimmed meat pieces may be used and the resultant meat product may take the form of steaks, cutlets, chops or small roasts having a thickness of up to about one half inch or more. The shape or form of the product can also be selected to best suit the resultant product thereby obviating waste while providing an added convenience to the purchaser.

The present invention preferably utilizes beef as the primary source of meat. However, various types and sources of red meat or poultry also can be advantageously employed. For example, excellent results have been obtained when the beef is replaced entirely or partially by suitable cuts of pork. Additionally, other sources of meat such as veal, mutton, lamb, chicken, turkey, venison, and the like may also be utilized, although for practical purposes, the principal commercial types of meat used in this country are preferred and the invention will be illustrated primarily in connection with the use of beef.

In practicing the invention the small meat pieces forming the major portion of the meat product, namely, about 75 - 95% and preferably about 85 - 93% thereof, are generally bonded fresh meat of the more economical cuts. In this connection fresh meats are generally considered to be the meat resulting from a recently slaughtered animal, usually refrigerated or chilled under normal conditions or frozen soon after slaughter. Additionally, the more economical cuts from the underside of the quality grade animals can be advantageously used. However, as mentioned hereinbefore it is particularly important in the present invention that these meat pieces not be in a frozen condition at the time of blending or mixing with the bonding composition. Thus, the boned and untrimmed, semi-trimmed or trimmed pieces of meat cut from any portion of the carcass together with other economical beef cuts of the desired quality can be used. These small pieces should be used at a temperature below about 50° F and preferably at a temperature of approximately 35° - 40° F for best results. Such meat cuts generally have a lean content greater than 35% by weight and frequently average about 40 - 50% by weight and more of lean meat. Thus, boned but untrimmed pieces having an average lean content of about 45% are generally used for the bacon product while a lean content of more than 90% may be used for corned beef, ham and the like. Of course, lean cuts may be combined with poorer cuts to adjust the total fat content of the composite product.

The meat is cut into small $\frac{1}{4}$ to 8 ounce pieces and preferably 1 to 2 ounce pieces either by hand or by some appropriate machinery prior to the mixing operation. It is important that the pieces be of this small size and in most instances not exceed about 4 ounces or more in order to provide adequate surface area for coating by the binding and curing agent, thus avoiding excessive bulk into which the curing agent must permeate. Accordingly, chunks of beef having a size larger than about one half pound or more are not desired and generally are further cut to the smaller one to four ounce preferred size in order to take advantage of the process features of the present invention.

The particular curing agent component of the binder composition will vary somewhat in order to provide the appropriate taste in the resultant product. As mentioned, the curing agent is of a conventional composition and preferably constitutes about 50 - 65 percent of the binder composition. In turn, the binder is used in proportion to the meat pieces in an amount within the range of about 1:5 to 1:20 and preferably about 1:12. Thus for each 100 pounds of small meat pieces, it is preferred that about 10 - 12 pounds of curing and binding composition be used. Since the curing agent is fully incorporated into the meat product, the specific amount thereof employed will have a definite effect on the taste of the product. Usually the salt content of the composite product will be about 0.5 - 2.5 percent.

Many modifications of the basic meat curing art are well known and generally the salt or brine curing agent or mix is formulated by incorporating such additives as sugar, sodium nitrites and nitrates, meat phosphates, sodium erythorbate or monosodium glutamate, hydrolized plant protein and the like and various flavorings and spices. Although some curing compositions have been applied in dry form to the surface of the meat, the use of aqueous salt solutions is preferred in accordance with the present invention. An aqueous curing agent, after being appropriately prepared is then cooled to about 20° F prior to being admixed with the lead ground meat to provide the paste-like or sticky binding composition. In this connection it has been found desirable to keep the curing agent at about 20° F prior to blending with the ground meat to enhance the blending properties and produce better binding properties in the resultant blend.

A typical example of a curing agent formulation found useful in the present invention for use with approximately 100 pounds of meat is as follows:

Water: 4 pounds
Salt: 2 pounds
Sugar: 8 ounces
Meat phosphates: 8 ounces
Prague powder: 4 ounces
Monosodium glutamate: 2 ounces
Hydrolized plant protein: 2 ounces.

The meat phosphates utilized in accordance with the teaching of the present invention include the conventional meat phosphates approved by the USDA and extensively utilized in the industry such as sodium tripolyphosphate, sodium pyrophosphate, sodium hexametaphosphate and the like. These alkaline phosphates have become widely used as curing agents both alone and in combination with salt and the alkaline nitrates and nitrites (listed above as Prague powder). As is shown, sodium nitrite and/or sodium nitrate is used to produce the desired pink coloration in the cured product.

The aqueous brine curing agent is admixed with approximately an equal portion of lean ground meat in order to provide the requisite binder of sticky consistency. Generally, the ground meat constitutes up to as much as about 25% of the total meat product and can be lean meat of any desired quality although usually of lower quality than the small meat pieces used as the primary components of the meat product. The preferred amount of ground lean meat employed is, however, in the range of about 2% to 8% by weight. As will be appreciated, this amount can be varied in order to at least partially assist in the control of the lean and fat content of the final product.

The ground lean meat can be obtained from any part of the carcass and may be of any quality meat, even of commercial grades. The meat is preferably chilled to about 20° F and ground three or four times to give it the appropriate fine consistency. A portion of the curing agent usually is added thereto during the grinding operation so that upon completion of the grinding, the remainder can be readily blended therewith and intermixed until the resultant binder composition exhibits a pasty or sticky consistency. Thereafter, it is precooled to about 0° F prior to mixing with the small meat pieces to assure its adherence to the surfaces thereof and provide an appropriate coating thereon.

It is an advantage of the present invention that slight modifications of the product can be easily accomplished. For example, when it is desirable to produce a product having a hickory smoked flavor, taste and aroma, a portion of the ground lean meat may be replaced with the appropriate amount of strongly smoked ground meat or artificial hickory flavoring may be added at the time the binder is formulated. Generally, smoked meat comprising about three to four percent of the total product will be sufficient to impart the requisite smoked effect. Additionally, other ingredients such as powdered pastrami spices may be added to the curing and binding composition to appropriately adjust the taste of the product.

It is a feature of the process of the present invention that the binder composition should be cooled to a temperature well below that of the small meat pieces prior to the mixing operation. That is, the binder composition should be cooled to a temperature of about 0° F, or about 10° - 50° F lower and preferably 32° - 40° F lower than the temperature of the meat pieces to which it is added. This can be readily accomplished by precooling both the brine curing agent and ground lean meat prior to blending and further cooling the blended composition so that it is at a temperature of about 0° F yet is still fluid. The blending of the ground lean meat at the precooled temperature of about 20° F with about one half of the curing agent during the grinding operation facilitates the addition of the rest of the curing agent and provides for thorough blending and good binding characteristics. The small meat pieces are kept about 32° F so that as the binding composition is blended with these meat pieces it will tend to adhere to the warmer surfaces thereof and assure a thin coating thereon in preparation for the subsequent curing and heating operations.

Following the mixing procedure the combined uncooked meat pieces and binder may be packed into a suitable natural or synthetic casing and compacted therein prior to shaping or molding. The casing should be of a moisture impermeable type and preferably takes the form of a flexible plastic envelope of an appropriate size to provide the desired shape after it has been placed in the molding form. The plastic casing may be polyethylene, vinylidene chloride copolymer, pliofilm or similar materials. The size and shape of the casing will depend on the size of the product desired. For example, a casing having a diameter of about 6 inches is suitable for producing a block or slab of meat product having either a circular cross-section or a generally rectangular configuration measuring approximately 16 × 7 × 4 inches.

After the material has been shaped, it can be heated immediately but preferably is allowed to stand under refrigeration at a temperature of about 35° - 45° F and preferably at about 38° - 42° F for a period of at least 14 hours and preferably 16 hours or more to permit curing. Thus, the compacted or molded meat product may be kept under refrigeration in this condition for about 1 or 2 days in order to provide sufficient time for penetration of the curing agent through the individual small uncooked meat pieces on which it is coated. As will be appreciated, substantially larger pieces than the desired 1 to 2 ounce size would require a longer period of time in order to provide the desired curing action. The preferred smaller pieces not only cure faster but also provide added surface area which is coated by curing agent thus facilitating a more rapid cure of the meat pieces by a thin coating of curing agent on the respective pieces.

Alternatively and preferably, the mixture of small meat pieces and binding composition may be cured during storage prior to the packing and shaping operation. In that event, it is usually preferable to remix the cured material for one or two minutes prior to packing in the moisture impermeable casing and shaping to achieve the desired form. It will be appreciated that the curing period is substantially as indicated hereinbefore and is equal to the conventional lapse of time between work days. Thus, the product could be placed under refrigeration during one working day and would be fully cured and ready for the packing and heat processing operations on the following day. This is particularly advantageous since it would provide for substantially no lost time in the processing of the products. Additionally, since the product is refrigerated during the curing operation, it can be permitted to stand for periods longer than 16 hours such as over a weekend period without adversely affecting the product's quality or characteristics.

The cured product is then subjected to incremental heat processing that involves an initial product conditioning operation which preferentially takes place at a temperature of about 105° - 115° F and preferably at about 110° F for a period of about 1 to 2 hours. Thus, the cured product within the flexible plastic casing is placed within a heating tank or vat and kept at the requisite temperature for a sufficient length of time to provide a conditioning of the outside or skin portion of the product. This conditioning is also required to attain the desired pink coloration in the interior meat portions of the product. Additionally, the temperature assures that the outside surface of the meat product is sufficiently warm to prevent fat separation and initiate the binding operation. Although the length of time of the conditioning operation may vary somewhat the temperature should be closely controlled at about the 110° - 112° F level.

Upon completion of the conditioning portion of the heating process, the temperature of the water is increased about 10° F to approximately 117° - 125° F and preferably about 120° - 122° F and is held at this temperature for a period of about 2 to 3 hours or for a sufficient length of time to bring the internal temperature of the meat product up to at least the 110° - 112° F level where the binder will start to blend into the pieces on which it is coated. Preferably, the internal temperature will be brought close to 120° F so as to destroy unwanted bacteria or other micro-organism while simultaneously accelerating the curing action. As taught in my aforementioned U.S. Pat. No. 3,663,233 this temperature is favorable to an enzymatic reaction that weakens the connective tissue between the meat fibers while inhibiting and even destroying bacteria. However, in accordance with this invention, it is not necessary to use the 9 to 10 hour tenderizing period described in that earlier patent.

Subsequently, the temperature of the tank is increased to approximately 160° - 162° F and kept at that temperature until the internal temperature of the meat product reaches about 135° F. Since this temperature is below the 148° F temperature normally considered as required for a cooked product, the resultant product can be generally considered as a cured precooked material.

In those instances where a pastrami product is desired and pastrami spices in powdered form were added to the curing agent, it is generally preferred to raise the heating temperature to about 166° F and raise the internal temperature of the product to about 148° F and above thereby cooking the beef. Ham and corned beef products may be similarly heated. Subsequently, after cooling, additional spice is preferably applied to the outer surface of the product. As indicated in the drawing it is also possible to directly heat the packed material without waiting for the curing period.

The processed meat is next cooled with water to a temperature of about 95° - 100° F and is then placed in storage under refrigeration. Subsequently, or as soon as the material has cooled to about 32° - 34° F, it can be sliced to an appropriate size and thickness. Advantageously, the resultant product exhibits the texture, color and general appearance of primal beef cuts as well as a uniformity of moisture distribution and a unified character having excellent slicing qualities. Additionally, it can be fried, broiled or grilled in a shorter time than bacon while exhibiting substantially the same appearance.

As indicated in FIG. 1 a further alternative step in the process of the present invention involves the complete sterilization of the cured and bound product within its sealed casing so that refrigeration of the resultant product is unnecessary, although nevertheless preferred. This feature is of particular importance since it can be incorporated into the process without altering the appearance of the cured product and without causing shrinkage thereof or loss of green weight. Thus, after the product has been subjected to the three-step incremental heating, it is held at a temperature of about 130° F in either a water bath or in a room maintained at that temperature for a period of approximately 48 hours. This additional sterilizing period has an effect comparable to the effect of cooking the product at 250° F for a period of about 30 minutes. However, unlike a product that has been cooked for 30 minutes at about 250° F, the product of the present invention does not shrink or exhibit any weight loss due to the sterilization process. Additionally, it exhibits a fresh meat taste and the desired pink coloration of the freshly cured meat product. As will be appreciated, the complete sterilization can be achieved at a somewhat lower temperature for a long period of time or at a slightly higher temperature not substantially exceeding 145° F for a slightly reduced time period. In view of this operating range, it is also possible to provide a complete sterilization step prior to the three-step incremental heating. However, the preferred method is to provide the complete sterilization at 130° F after the incremental heating operation and for a period of approximately 48 hours.

In order that the present invention may be more readily understood, it will be further described with reference to the following specific examples which are given by way of illustration only and are not intended to be a limit on the practice of the invention.

EXAMPLE I

A curing and binding composition was prepared by initially preparing the curing agent from the following materials in the amounts set forth:

| Materials | Amount |
| --- | --- |
| Water | 4 lbs. |
| Salt | 2 lbs. |
| Sugar | 8 ozs. |
| Meat phosphates | 8 ozs. |
| Monosodium glutamate | 2 ozs. |
| Hydrolized plant protein | 1½ ozs. |
| Sodium erythorbate | 1 oz. |
| Sodium nitrite | ½ oz. |
| Sodium nitrate | 1¼ oz. |
| Smoked flavor | 1½ ozs. |

All of the foregoing materials were mixed and cooled to a temperature of 20° F. 5 pounds of fresh, lean meat then was cut into small pieces and cooled to about 20° F. The cooled meat was ground four times with about one half of the curing agent being added to the meat during the grinding operation. After the grinding was completed, the remainder of the curing agent was added to the ground, leaned meat and blended therein until the entire mixture became sticky. The combined curing and binding composition was then cooled to a temperature of 0° F at which temperature it remained a soft sticky mass due to its high salt content.

The foregoing binding agent was used to bind one hundred pounds of 1 to 2 ounce pieces of untrimmed beef. It produced satisfactory results which bonded the pieces in such a manner that the lines of demarcation between the meat pieces were fused so as to appear to be primal meat cuts.

The identical binding composition was used with equally good results to bind one hundred pounds of pork.

EXAMPLE II

The curing and binding composition as prepared in Example I was used to prepare a beef-bacon product and a pork-bacon product. The beef-bacon product was prepared from the navals, plates, short ribs and similar parts of the carcass and were cut into 1 to 6 ounce pieces. All pieces were boned and trimmed to an appropriate lean and fat proportion. In the case of the fabricated pork-bacon, the pork trimmings, bellies and other parts of the carcass were used and were cut into small pieces having an average weight of one to two ounces. In both instances, the small pieces of beef and pork were maintained at a temperature below 50° F and preferably within a range of about 38° - 42° F.

One hundred pounds of the small pieces of beef were mixed with the curing and binding composition as formulated in Example I and were intermixed for a period of about 2 to 3 minutes to assure substantially uniform contact between the binding and curing composition and the small meat pieces. The mixture was then refrigerated at about 38° - F and permitted to cure for a period of about 14 hours. After curing, the material was remixed for one to two minutes and then placed within water impermeable plastic casings and shaped into a generally rectangular loaf-like form having dimensions of 17 × 7 × 4. The loaves were then heated in a water tank having an initial water temperature of approximately 50° F for a period sufficient to raise the temperature to between 108° - 112° F. This heating operation took place over a period of about 1½ to 2 hours. The water temperature was then increased by about 10° and maintained at that increased temperature for another two hours and was finally raised to a temperature of about 165° F until the internal temperature of the product has reached 135° F. The meat product was then removed from the heating bath and cooled to a temperature of about 95° F before being placed within a refrigerator unit where it was cooled to about 38° - 42° F.

The resultant product was subsequently sliced and packaged to provide thin strips of a bacon-like product having a pink coloration within the meat portions and having an integral firm interconnection between adjacent meat and fat portions. No loss in green weight was evident in the resultant product over the amount of material utilized and the product had a firm solid integrity which remained fully intact during the cutting of the material into thin slices.

EXAMPLE III

A curing and binding composition for corned beef was prepared by blending 4 pounds of ground lean beef with a curing agent comprised of 3½ pounds of water, 2 pounds of salt, 8 ounces of meat phosphate, 5 ounces of soluable corn beef spices, 4 ounces of sugar, 2 ounces of monosodium glutamate, ¾ ounce of sodium erythorbate, ¾ ounce of sodium bicarbonate, ¼ ounce of sodium nitrite and ¼ ounce of sodium nitrate. The curing agent was then mixed with the finely ground meat in substantially the same manner as in Example I, and was cooled to a temperature of about 0° F.

The binding and curing composition was then intermixed with one hundred pounds of fresh beef pieces of a size varying from 1 to 8 ounces and having an average size of about 3 to 4 ounces. The fresh small pieces of meat were at a temperature of about 32° at the time of intermixing with the binding and curing agent. The material was then stuffed into water impermeable plastic casings and was permitted to cure under refrigeration for a period of about 15 hours. The cured material was then heat treated in the manner set forth in Example II with the exception that the final heating of the meat material was continued until the internal temperature of the product was 148° before the heating operation was discontinued. The resultant product had a clear pink coloration and all portions thereof were firmly bound together permitting easy slicing and packaging.

EXAMPLE IV

The procedure of Examples I and II was repeated except that the curing agent did not contain any smoked flavor and the pieces of fresh meat were pieces of ham having a weight of about 4 - 8 ounces.

EXAMPLE V

Bonded meat products were produced in accordance with the procedure of Example II using fresh meat pieces from beef, pork, veal, lamb, chicken and venison. In all of these products, the same curing and binding agent was employed. This binding agent was used with 100 pounds of the fresh meat that was cut to an average size of about 2 to 3 ounces. The curing and binding composition used in each product was as follows:

| Material | Amount |
|---|---|
| Ground lean meat | 5 lbs. |
| Water | 3½ lbs. |
| Salt | 1 lb. 2 oz. |
| Meat phosphate | 8 oz. |
| Monosodium glutamate | 2½ oz. |
| Sodium bicarbonate | 1¼ oz. |
| Sodium erythorbate | 1 oz. |
| Sodium nitrite | ¼ oz. |
| Sodium nitrate | ¼ oz. |

The binding composition was used at a temperature of 0° F and was blended with the meat pieces that were maintained at a temperature of about 38 – 42° F.

EXAMPLE VI

The procedure of Examples I and II was repeated. However, at the end of the heating step when the temperature of the meat had reached about 135° F, the product was cooled to room temperature and was stored for a period of 4 months under refrigeration without adverse effect.

As will be apparent to persons skilled in the art, various modifications, adaptations and variations of the foregoing specific disclosure can be made without departing from the teachings of the present invention.

I claim:

1. A cured sterilized and uncooked composite non-dehydrated meat product having a controlled fat content of less than about 75% by weight and well suited for cutting into bacon-like strips comprising a plurality of meat pieces having a weight of about one-half pound or less integrally bonded into a solid unified meat mass by compression within a mold and heating to an internal temperature of about 135° F, said meat pieces have a lean meat content of about 40% – 50% by weight and a fat content of at least about 50% by weight, said product having integrated boundaries between said abutting meat pieces as well as between lean and fat areas thereof, and a binder at least partially absorbed by the meat pieces and wherein said heating effects sterilization and fused integration of the meat pieces at said boundaries without the binder being substantially noticeable in the final product, said meat pieces comprising about 75% or more of the product, said binder consisting essentially of an aqueous brine curing agent and ground lean meat, the ratio of said brine to meat pieces being 1:6 to 1:15 and said ground meat comprising about 10% by weight or less of the composite meat product.

2. The composite meat product of claim 1 wherein the binder constitutes about 10% by weight of the product based on the weight of the meat pieces.

3. The composite meat product of claim 1 wherein the binder includes pastrami spices.

4. The composite meat product of claim 1 wherein the meat is selected from the group consisting of beef, pork, veal, lamb and poultry.

5. The composite meat product of claim 1 wherein the meat prices are of about 1-2 ounce size.

* * * * *